United States Patent [19]
Jensen, Jr.

[11] 3,877,301

[45] Apr. 15, 1975

[54] APPARATUS FOR INDICATING THE SPECIFIC CAPACITY OF A WELL

[76] Inventor: Owen F. Jensen, Jr., Box 18294, Houston, Tex. 77023

[22] Filed: Oct. 23, 1973

[21] Appl. No.: 408,660

[52] U.S. Cl. ................................................. 73/155
[51] Int. Cl. ........................................... E21b 47/04
[58] Field of Search .................. 73/155; 166/64, 253

[56] References Cited
UNITED STATES PATENTS

| 2,320,492 | 6/1943 | Walker | 73/155 |
| 2,818,728 | 1/1958 | Hartline et al. | 73/155 |

*Primary Examiner*—Jerry W. Myracle
*Attorney, Agent, or Firm*—Bargfrede and Thompson

[57] ABSTRACT

A first signal is obtained that is proportional to the distance the fluid level of the well drops below the static fluid level at the rate the well is being produced. This signal is divided into a signal that is proportional to the volume of liquid being produced per unit of time. This provides a third signal that is proportional to the specific capacity of the well. The third signal is fed to a readout or printout mechanism to indicate the specific capacity of the well for the rate the well is being produced at that time.

3 Claims, 2 Drawing Figures

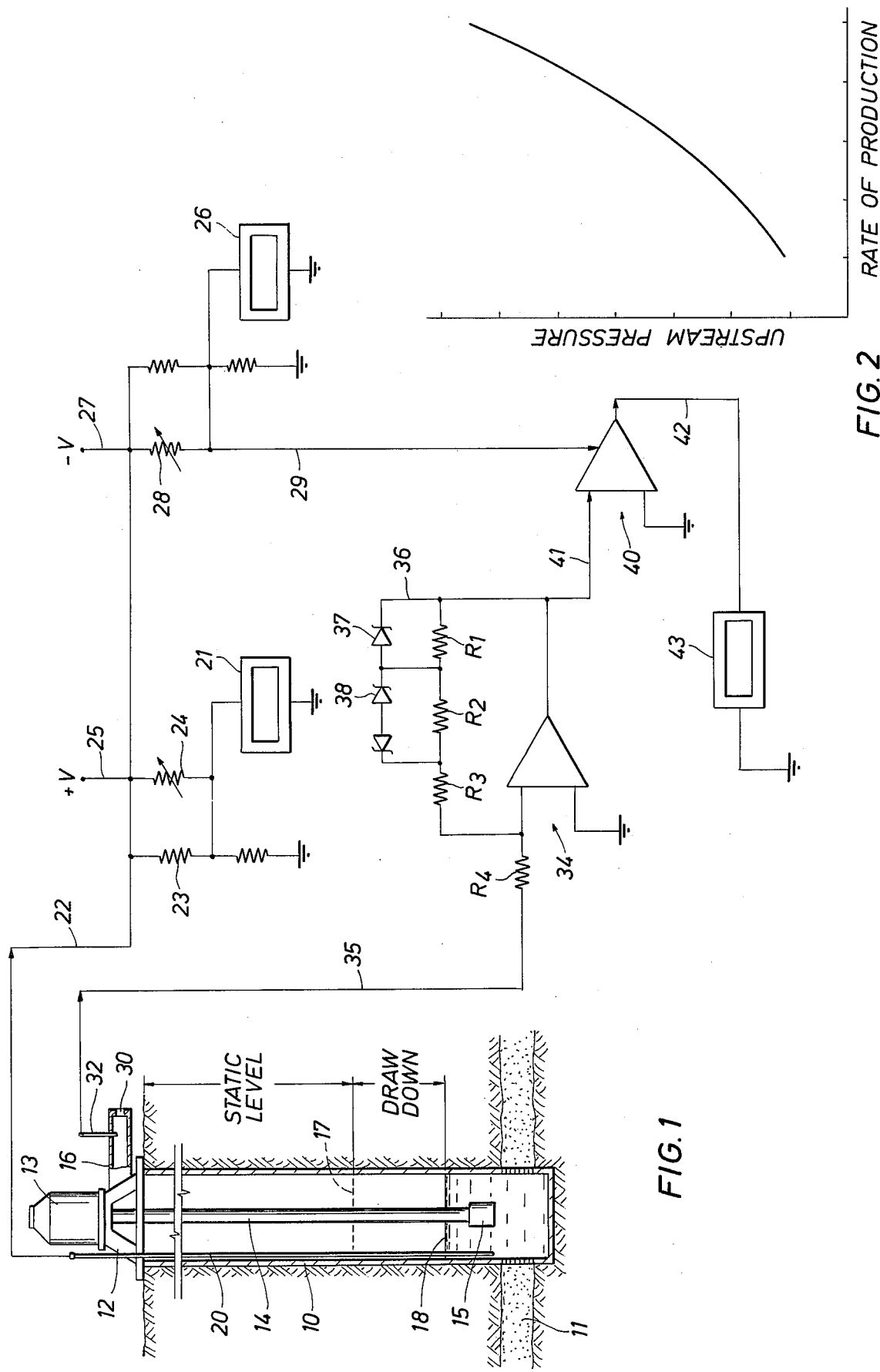

APPARATUS FOR INDICATING THE SPECIFIC CAPACITY OF A WELL

This invention relates to apparatus for and a method of indicating the specific capacity of a well.

The specific capacity of a well is the volume of liquid produced per unit of time for a given drop in the level of the liquid in the well. In water wells, the specific capacity is usually expressed in gallons per minute per foot of drop in the liquid level. In oil wells it is usually expressed as barrels per day per psi drop in bottom hole pressure. In the latter case, the distance the liquid level drops is expressed by the change in pressure exerted by the liquid at some selected point below the liquid level. Knowing the specific gravity of the liquid involved, the drop in liquid level in feet can be converted to change in hydrostatic pressure in pounds per square inch and vice versa. The distance the liquid level drops is often called "draw down."

It is particularly important for operators to know the specific capacity of a given well, where the well is to be pumped. Knowing the specific capacity of a well, the operator can select an optimum production rate for the well. The production rate and the specific capacity of the well tells the operator where the liquid level will be for the selected production rate. With this information he can select the proper size pump for the well. He can also locate his pump so that the liquid level doesn't drop below the pump, which usually results in damage to the pump.

Obaining the specific capacity of a well in the past was a time consuming and laborious process. The draw down should be measured at several production rates so that a specific capacity curve can be plotted for the well, since the specific capacity of a well will vary in most cases as the pumping rate changes.

It is an object of this invention to provide a method of and apparatus for obtaining the specific capacity of a well quickly and easily at varying production rates with no manual measurements or calculations required of the operator.

It is another object of this invention to provide apparatus for and a method of continuously indicating the specific capacity of a well.

These and other objects, advantages, and features of this invention will be apparent to those skilled in the art from a consideration of this specification, including the attached drawings and appended claims.

In the drawings:

FIG. 1 is a vertical cross section of a well equipped with a pump and a circuit diagram of the apparatus employed in the preferred embodiment of this invention to provide the instantaneous, automatic readout of the specific capacity of the well; and FIG. 2 is a typical curve for a flow measuring orifice, such as the type employed in the preferred embodiment of this invention.

The well shown includes casing 10 that is positioned in a well bore that penetrates producing formation 11, for example, a water bearing sand. Well head 12 is attached to the upper end of casing 10 and supports electric motor 13. Tubing 14 extends into casing 10 below the level of the liquid to be produced and supports pump 15 at the lower end thereof. The pump is driven by electric motor 13 and pumps the liquid in the well up the tubing and out discharge line 16, either into a pipeline, tank, or the like.

When the well is not being produced, the liquid from the producing formation will rise in casing 10 to some level. This level is indicated by the dotted line 17 and is referred to as the static fluid level, the level to which the liquid rises when everything is static. When the well is being produced, the level of the liquid in casing 10 will drop. The distance that the liquid level drops usually varies directly with the rate of production although not necessarily linearly. As stated above, the distance the static fluid level drops for a given rate of production is generally referred to as the draw down. In FIG. 1, it is the distance from static fluid level 17 to producing fluid level 18.

In accordance with this invention, means are provided to give a first signal that is proportional to the distance the fluid level drops below the static fluid level at the rate the well is being produced. In the embodiment shown, cable assembly 20 is supported by well head 12 and extends into casing 10 to a point well below the expected drop in the fluid level for the rate the well is going to be produced. As shown, the end of the probe is approximately adjacent pump 15. As explained in copending patent application Ser. No. 333,025, filed Feb. 16, 1973, and entitled Capacitance Sensing Apparatus, the lower end of the cable assembly comprises a probe that is partially immersed in the liquid in the well. The capacitance between the probe and the surrounding liquid changes as the liquid level changes. As explained in the application, the capacitance can be used to provide a signal having a voltage that is proportional to the liquid level of the well.

Since the specific capacity of the well was not known when the pump was installed so that this information could be obtained, the operator should monitor the distance the fluid level drops as he changes the rate of production to avoid dropping the level below the pump. Therefore, in the embodiment shown the signal is first adapted to provide a visual readout of the distance to the liquid level from the surface. The output signal of the probe is connected to digital readout instrument 21 by conductor 22 and parallel resistors 23 and 24. A bias voltage is introduced through conductor 25 that is proportional to the distance to the static fluid level. Variable resistor 24 is adjusted for the meter to read out the static fluid level when the well is not being produced. The bias voltage in conductor 25 is shown positive as the voltage from the probe is arbitrarily assumed to be positive.

To obtain a signal that is proportional to the draw down for use in indicating specific capacity, a negative bias voltage is introduced into the circuit through line 27. Variable resistor 28, then, is adjusted so that the voltage in line 29 will be proportional to the draw down. This signal is to be used to indicate specific capacity of the well. It also is read directly on meter 26.

In accordance with this invention, means provide a second signal that is proportional to the rate of production of the well. In the embodiment shown, orifice 30 is located in discharge line 16. FIG. 2 shows a typical performance curve for an orifice, such as orifice 30. These curves are usually obtained empirically and vary with the size of orifice and the size of conduit in which the orifice is located. For the selected orifice this information is available so that if the upstream pressure is known, which is usually measured in inches of water, the flow rate through the orifice can be determined from the graph. For water, this is usually gallons per minute. This is a very accurate way of measuring the volume of fluid flowing through a conduit. To measure the upstream pressure in this embodiment of the invention, manometer 32 is connected into discharge line 16 upstream of orifice 30. In the embodiment shown, to obtain the second signal, a signal is provided that is proportional to the pressure upstream of orifice 30 and then this signal is converted to a signal proportional to the rate of production. To obtain the signal proportional to the upstream pressure, a probe (not shown), similar to probe 20, is located in manometer 32 and positioned to provide an output signal proportional to the fluid level of the liquid in the manometer. This measurement is height of liquid in the manometer above a datum line, usually the longitudinal horizontal axis of pipe 16. The probe in the manometer operates on the same principle as probe 20 and as described in the above-identified patent application.

The signal from the probe in the manometer is transmitted to operational amplifier 34 through line 35. Amplifier 34 has a feedback network comprising a plurality of resistors in series, along with a shunting circuit for each resistor. In the embodiment shown, three resistors $R_1$, $R_2$, and $R_3$ are used in the feedback circuit. Loop 36, containing Zener diode 37, is connected, as shown, to shunt resistor $R_1$ out of the feedback circuit when Zener diode 37 conducts. This effectively drops resistor $R_1$ out of the feedback circuit and changes the gain of the amplifier. In the same manner, when Zener diode 38 conducts, resistor $R_2$ is dropped out of the feedback circuit, again changing the gain of the amplifier. Resistors $R_1$, $R_2$, and $R_3$, along with input resistor $R_4$, are designed so that the gain initially, when all three resistors in series are in the feedback circuit, is equivalent to the slope of a straight line that approximates one portion of the curve of FIG. 2. Then, when $R_1$ drops out, the gain approximates the slope of a straight line that approximates another portion of the curve, and so forth, so that the output signal of amplifier 34 will approximate the curve of FIG. 2. Thus, with an input signal proportional to upstream pressure with the gain of the amplifier being approximately equal to the curve of FIG. 2, the output of the amplifier will be proportional to the rate of production for the given upstream pressure being measured by manometer 32.

The output signal is transmitted from amplifier 34 to amplifier 40 through line 41. Amplifier 40 acts as a divider. The first signal in line 29, which is the signal that is proportional to the draw down of the well, controls the gain of amplifier 40 so that it effectively divides the signal from amplifier 34 by a value proportional to the signal in line 29. Thus, the output signal of amplifier 40 is proportional to the rate of production of the well divided by the draw down, i.e., to the specific capacity of the well. This signal is transmitted through line 42 to digital readout meter 43 which will indicate continuously the specific capacity of the well. In addition, or alternatively, the signal in line 42 can be fed to a strip chart recorder and a continous record of the specific capacity of the well can be plotted over a long period of time. Also, alternatively, the apparatus can be arranged to record for a short period of time and then turn off for a period of time and then record again in any desired sequence.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the apparatus and method of this invention without departing from the scope thereof, it is to be understood that all matter herein set forth or shown in the accompanying drawings is to be interpreted as illustrative and not in a limiting sense.

The invention having been described, what is claimed is:

1. Apparatus for measuring the specific capacity of a well producing a liquid, such as water, while pumping the well at a substantially constant rate of production, said apparatus comprising means providing a first signal that is proportional to the distance the fluid level drops below the static fluid level at the rate the well is being produced, means providing a second signal that is proportional to the volume of liquid produced per unit of time; means for dividing the second signal by the first signal to provide a third signal having a value proportional to the specific capacity of the well, and means responsive to the third signal to indicate the specific capacity.

2. The apparatus of claim 1 in which the means providing the second signal includes an orifice restricting the flow of liquid from the well, a pressure gage having a liquid column the height of which indicates the rate of flow of liquid through the orifice, and means responsive to the liquid level in the pressure gage providing a signal that is proportional to the volume of liquid per unit of time flowing from the well.

3. The apparatus of claim 2 in which said means providing the second signal further includes means providing a signal proportional to the liquid level in the pressure gage and an operational amplifier having a feedback circuit that varies the output of the amplifier so that it approximates the curve that represents the relationship of upstream pressure and rate of production for the orifice.

* * * * *